Feb. 3, 1970     A. F. HERMSDORFER     3,493,241
CONVERTIBLE BICYCLE
Filed April 19, 1968                   3 Sheets-Sheet 1
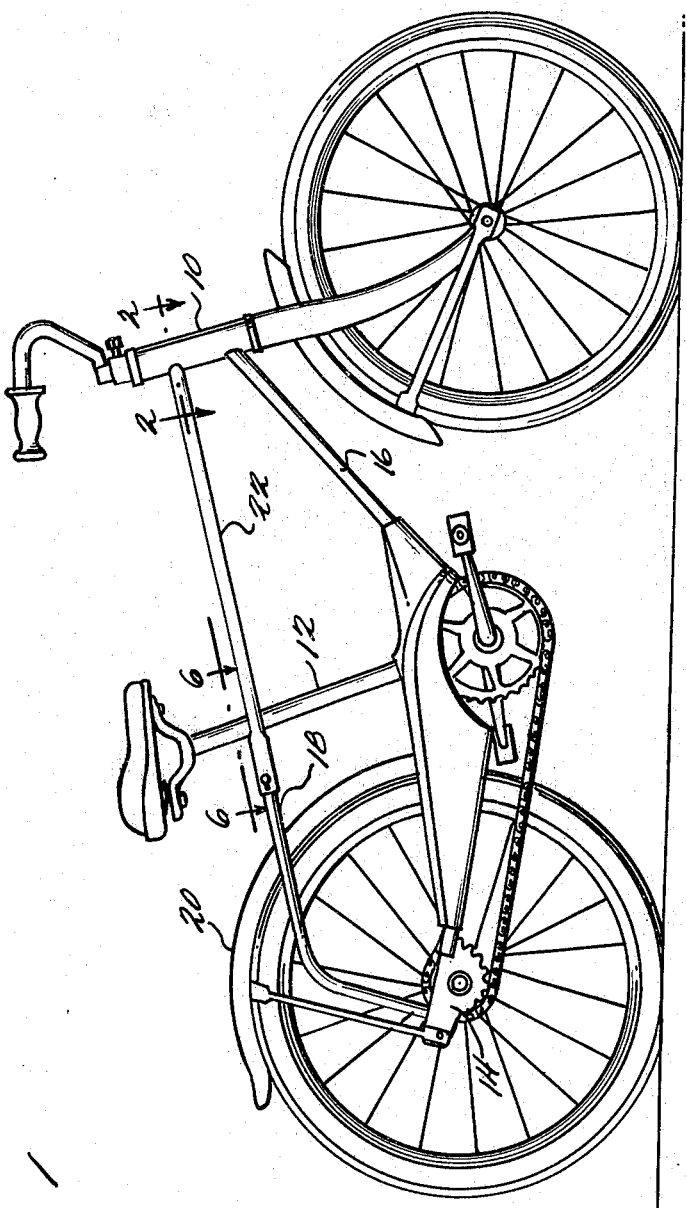
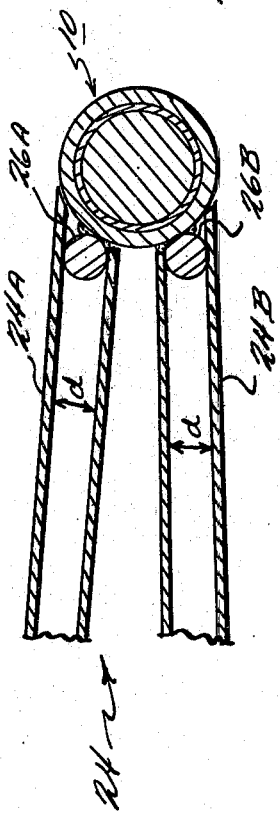
INVENTOR
ARTHUR F. HERMSDORFER
BY
Cushman, Darby & Cushman
ATTORNEYS Feb. 3, 1970 — A. F. HERMSDORFER — 3,493,241
CONVERTIBLE BICYCLE
Filed April 19, 1968 — 3 Sheets-Sheet 2
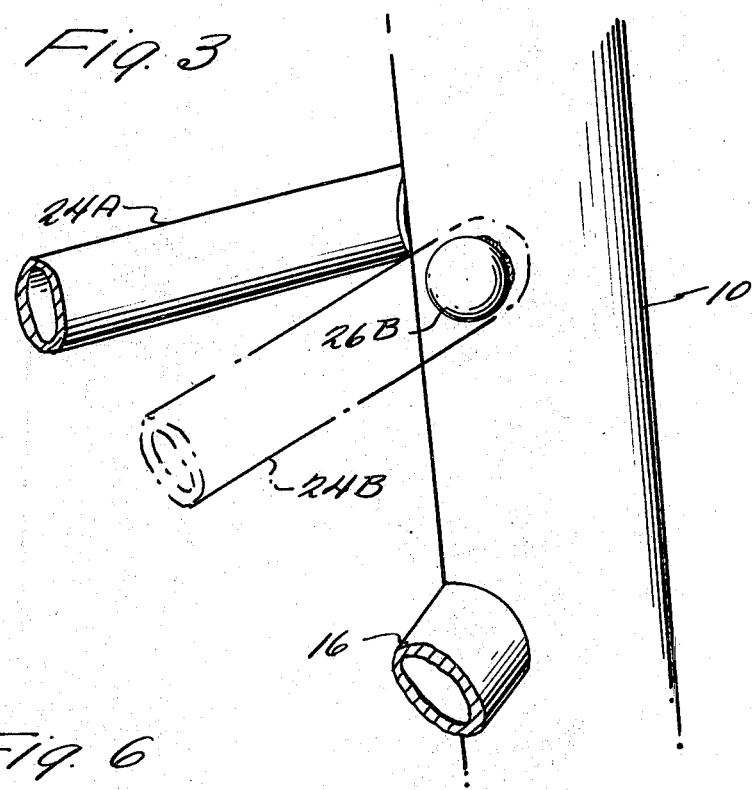
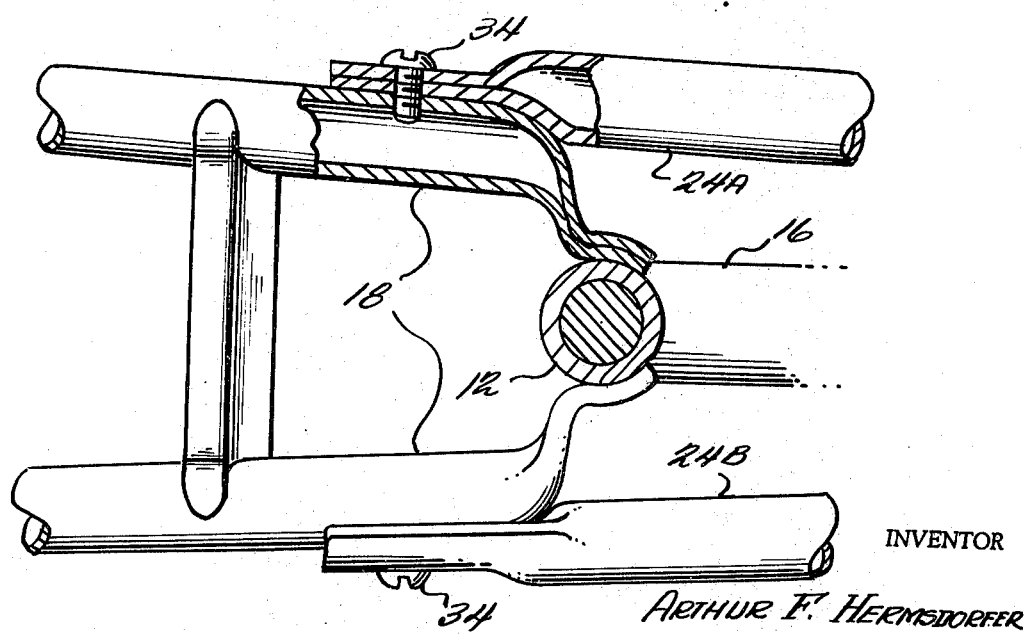
INVENTOR
ARTHUR F. HERMSDORFER
BY
Cushman, Darby & Cushman
ATTORNEYS INVENTOR
ARTHUR F. HERMSDORFER
BY Cushman, Darby & Cushman
ATTORNEYS

United States Patent Office 3,493,241
Patented Feb. 3, 1970

3,493,241
CONVERTIBLE BICYCLE
Arthur F. Hermsdorfer, Lawrenceburg, Tenn., assignor to The Murray Ohio Manufacturing Co., Nashville, Tenn., a corporation of Ohio
Filed Apr. 19, 1968, Ser. No. 722,657
Int. Cl. B62k 3/02, 13/00, 13/08
U.S. Cl. 280—7.11                                    8 Claims

ABSTRACT OF THE DISCLOSURE

A bicycle having an upper reach bar assembly which is removable to convert the bicycle from a boy's to a girl's model. The upper reach bar assembly comprises a pair of tubes each of which, in the boy's position, has its forward end surrounding and resting on a support element attached to the rear of the bicycle's head post tube. The rear end of each upper reach bar tube is crimped to conform with the curvature of the tubes comprising the bicycle's upper rear fork to which fork the upper reach bar tubes are removably fastened.

---

The invention relates to a bicycle construction convertible between a boy's and a girls' model. Such bicycles take several forms. For example, in Patent 3,088,747, assigned to the assignee of the present case, a unitary tank has its inner surfaces frictionally engaged by an anchoring device at the rear of the head post tube, the back portion of the tank being bolted to the seat mast tube. In converting from a boy's to a girl's model, or vice versa, the tank is inverted, snapped onto the anchoring means and bolted to the seat mast tube at a different location. In another form of convertible bicycle, the tank is pivotally connected to the rear of the head post tube. In the boy's position the rear of the tank is attached to the upper portion of the seat mast tube, whereas in the girl's position, the tank rests on the lower reach bar which extends from the bottom of the seat mast tube to the head post tube.

The present invention is directed to a convertible bicycle construction of the type in which that portion of the bicycle which in a boy's style serves as an upper reach bar, extending from the top of the seat mast tube to the top of the head post tube, is completely removed to convert the bicycle to a girl's model. More particularly, the convention relates to a convertible bicycle having a double tube upper reach bar with improved means for attaching the upper reach bar to the bicycle frame.

Briefly, the invention employs a pair of anchoring elements attached to the rear of the head post tube. These elements are dimensioned such that a tube forming part of the upper reach bar can be slipped over each element in a close fit. The two tubes are crimped at their rear ends so as to conform with the curvature of the tubes which form the upper rear fork extending from the top of the seat mast tube, outside the rear fender, to the rear wheel clip. Each of the upper reach bar tubes is removably fastened to its respective upper rear fork tube.

The invention will be more fully described by reference to the accompanying drawings, wherein:

FIGURE 1 is a side elevational view of the convertible bicycle construction arranged as a boy's model;

FIGURE 2 is a fragmented view in cross-section of a preferred embodiment of the invention taken along lines 2—2 in FIGURE 1;

FIGURE 3 is a fragmented perspective view of that general portion of the bicycle shown in FIGURE 2;

FIGURE 6 is a fragmented top elevational view, partially in section, taken along lines 6—6 in FIGURE 1.

Figure 7:
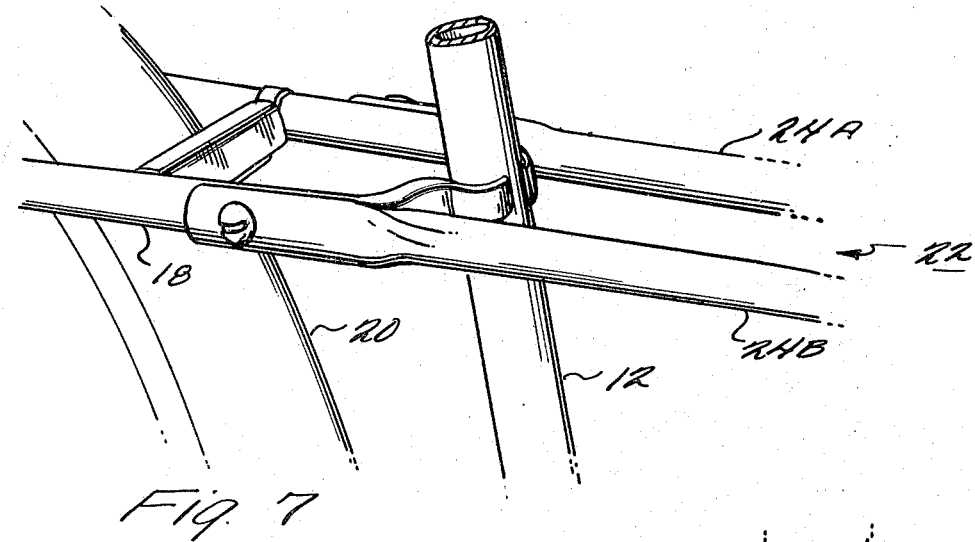
FIGURE 7 is a fragmented perspective view of that general portion of the bicycle shown in FIGURE 6.

Referring now to FIGURE 1, there is generally shown a bicycle frame aranged as a boy's model. The frame comprises a head post tube 10, a seat mast tube 12 and a rear wheel clip 14. A lower reach bar 16 extends between the bottom of the seat mast tube and the bottom portion of the head post tube. An upper rear fork 18 extends from the upper portion of the seat mast tube, outside rear fender 20, to the rear wheel clip. An upper reach bar assembly 22, connected to the forward end of fork 18, projects forwardly past the upper portion of the seat mast tube 12 to the upper portion of head post tube 10.

FIGURE 2 illustrates a preferred embodiment of an arrangement for supporting the forward portion of the upper reach bar assembly at the head post. More particularly, the upper reach bar assembly 22 comprises a pair of tubes, 24A and 24B, having an internal diameter $d$. A pair of balls 26A and 26B are permanently secured to the rear of the head post tube as, for example, by welding. These balls have a diameter slightly less than $d$ thereby permitting the tubes 24A and 24B to be slipped over the balls yet readily withdrawn when converting the bicycle to a girl's model. Such removal is indicated in FIGURE 3.

Figure 5:
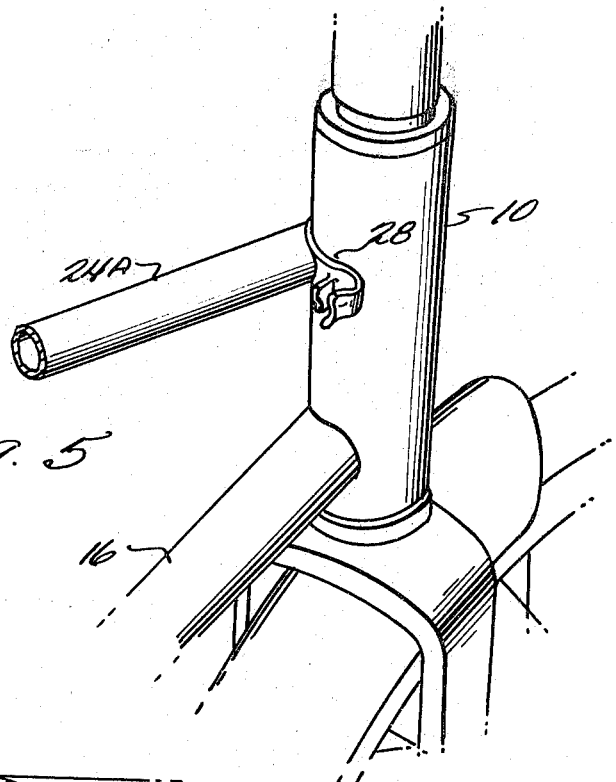
FIGURE 5 is a fragmented perspective view of that general portion of the bicycle shown in FIGURE 4.
Figure 4:
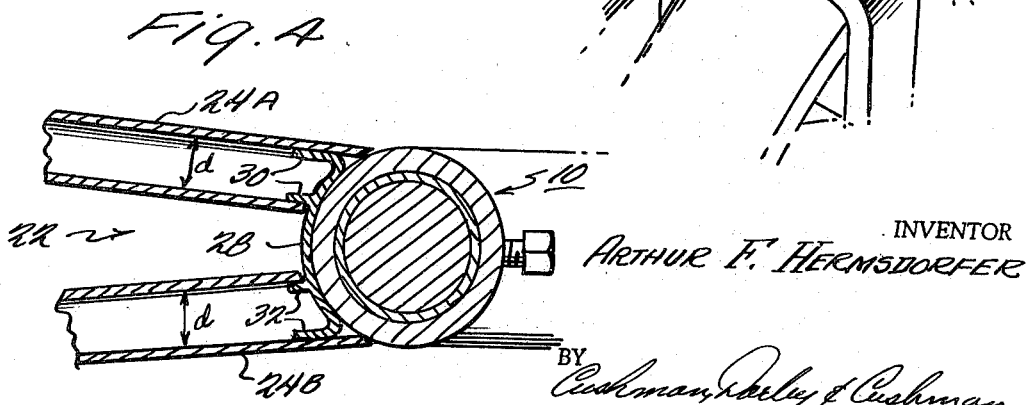
FIGURE 4 is a fragmented view in cross-section of an alternative embodiment of the invention taken along lines 2—2 in FIGURE 1.

FIGURE 4 illustrates an alternative embodiment of the invention wherein the support arrangement at the rear of head post tube 10 comprises a bracket 28 permanently attached to tube 10 by welding, or other conventional means. Two pairs of projections, 30 and 32, extend rearwardly from bracket 28. Each projection comprises a segment having a curvature generally corresponding to that of the inner surfaces of tubes 24A and 24B. The segments of each pair are spaced such that their outer surfaces are apart slightly less than the distance $d$ which corresponds to the internal diameter of tubes 24A and 24B. Thus, as in the case of the preferred embodiment shown in FIGURES 2 and 3, the upper reach bar tubes can be easily mounted in supported relationship with respect to the pairs of projecting segments and can be withdrawn readily from such position. This is most clearly shown in FIGURE 5.

FIGURES 6 and 7 illustrate a preferred arrangement for removably securing the rear ends of tubes 24A and 24B to the bicycle frame. This is accomplished by crimping the ends of these tubes so that they conform in contour with the curvature of the tubes forming the upper rear fork 18. The crimped portions of tubes 24A and 24B, as well as fork 18, are suitably drilled, and threaded as required, to receive screws 34. When converting from a boy's to a girl's model, the screws are removed and the tubes 24A and 24B are simply pulled away from the supporting means on the rear of the head post tube.

What is claimed is:

1. A convertible bicycle frame including a head post tube and a seat mast tube interconnected by a lower reach bar extending between the lower portions of said tubes; an upper rear fork joined to the upper portion of said seat mast tube; and an upper reach bar assembly removably positioned between the upper portion of the head post tube and the frame in the region of the upper portion of the seat mast tube, said upper reach bar assembly comprising a pair of individually removable tubes each having an inner diameter $d$; and means attached to, and projecting from, the rear of the head post tube for supporting one end of each of said upper reach bar tubes, said supporting means for each upper reach bar tube being dimensioned approximately equal to $d$ to permit said tube end to be slipped in a close fit over its associated supporting means.

2. A convertible bicycle frame as set forth in claim 1, wherein each supporting means comprises a ball having a diameter slightly less than $d$.

3. A convertible bicycle frame as set forth in claim 1, wherein each supporting means comprises a pair of segments having a curvature generally corresponding to that of the inner surface of its associated upper reach bar tube, the segments being spaced such that their outer surfaces are separated by a distance slightly less than $d$.

4. A convertible bicycle frame as set forth in claim 1, wherein said upper rear fork comprises an additional pair of tubes extending rearwardly from said seat mast tube, the opposite ends of each of said upper reach bar tubes being crimped to conform in curvature with respective ones of the upper rear fork tubes; and means for removably securing each upper reach bar tube at its crimped portion to its respective upper rear fork tube.

5. A convertible bicycle frame as set forth in claim 4, wherein each supporting means comprises a ball having a diameter slightly less than $d$.

6. A convertible bicycle frame as set forth in claim 4, wherein each supporting means comprises a pair of segments having a curvature generally corresponding to that of the inner surface of its associated upper reach bar tube, the segments being spaced such that their outer surfaces are separated by a distance slightly less than $d$.

7. A convertible bicycle frame including a head post tube and a seat mast tube interconnected by a lower reach bar extending between the lower portions of said tubes; an upper rear fork joined to the upper portion of said seat mast tube; and an upper reach bar assembly removably positioned between the upper portion of the head post tube and the frame in the region of the upper portion of the seat mast tube, said upper reach bar assembly comprising a pair of tubes each having an inner diameter $d$; and means attached to, and projecting from, the rear of the head post tube for supporting one end of each said upper reach bar tubes, said supporting means for each upper reach bar ube comprising a ball having a diameter slightly less than $d$ to permit said tube end to be slipped in a close fit over its associated ball.

8. A convertible bicycle frame including a head post tube and a seat mast tube interconnected by a lower reach bar extending between the lower portions of said tubes; an upper rear fork joined to the upper portion of said seat mast tube; and an upper reach bar assembly removably positioned between the upper portion of the head post tube and the frame in the region of the upper portion of the seat mast tube, said upper reach bar assembly comprising a pair of tubes each having an inner diameter $d$; and means attached to, and projecting from, the rear of the head post tube for supporting one end of each of said upper reach bar tubes, said supporting means for each upper reach bar tube comprising a pair of segments having a curvature generally corresponding to that of the inner surface of its associated upper reach bar tube, the segments being spaced such that their outer surfaces are separated by a distance slightly less than $d$ to permit said tube end to be slipped in a close fit over its associated segments.

References Cited

UNITED STATES PATENTS

| | | | |
|---|---|---|---|
| 2,354,125 | 7/1944 | Johnston | 280—7.11 |
| 2,798,739 | 7/1957 | Schreckengost et al. | 280—287 |
| 2,827,301 | 3/1958 | Stevens | 280—7.11 |
| 3,088,747 | 5/1963 | Hahn | 280—7.11 |

FOREIGN PATENTS 260,473    8/1949    Switzerland.

BENJAMIN HERSH, Primary Examiner

MILTON L. SMITH, Assistant Examiner

U.S. Cl. X.R.

280—278, 287